(12) United States Patent
Haupts

(10) Patent No.: US 11,186,324 B2
(45) Date of Patent: Nov. 30, 2021

(54) SIGNALING SYSTEM FOR FASTENING TO A ROOF OF A MOTOR VEHICLE AND MOTOR VEHICLE

(71) Applicant: FORD GLOBAL TECHNOLOGIES, LLC, Dearborn, MI (US)

(72) Inventor: Volker Haupts, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 566 days.

(21) Appl. No.: 15/963,385

(22) Filed: Apr. 26, 2018

(65) Prior Publication Data
US 2018/0327035 A1 Nov. 15, 2018

(30) Foreign Application Priority Data

May 12, 2017 (DE) .......................... 102017208026.4

(51) Int. Cl.
*B60Q 7/02* (2006.01)
*B62D 35/00* (2006.01)
*B60Q 1/26* (2006.01)
*B60Q 1/46* (2006.01)
*B60Q 5/00* (2006.01)

(52) U.S. Cl.
CPC ............ *B62D 35/00* (2013.01); *B60Q 1/2611* (2013.01); *B60Q 1/2615* (2013.01); *B60Q 1/46* (2013.01); *B60Q 5/00* (2013.01)

(58) Field of Classification Search
CPC ........ B62D 35/00; B60Q 1/2615; B60Q 1/46; B60Q 5/00; B60Q 1/2611
USPC ........................................................ 340/472
See application file for complete search history.

(56) References Cited

U.S. PATENT DOCUMENTS 3,712,665 A * 1/1973 Klein ....................... B60J 7/106
296/218
4,334,211 A * 6/1982 McConnell ............ H04R 1/023
116/147
(Continued)

FOREIGN PATENT DOCUMENTS

DE 392010 C 6/1940
DE 19744717 A1 4/1999
(Continued)

OTHER PUBLICATIONS

Gaskell et al; "Aerodynamic Drag Reduction of Emergency Response Vehicles"; https://www.researchgate.net/publication/283123078 Aerodynamic Drag Reduction of Emergency Response Vehicles; Sep. 30, 2015; vol. 4, Issue 2.

*Primary Examiner* — Naomi J Small
(74) *Attorney, Agent, or Firm* — David Coppiellie, Esq.; Carlson, Gaskey & Olds, P.C.

(57) ABSTRACT

A signaling system provides at least one emergency services signal for fastening to a roof of a motor vehicle. The signaling system includes a housing that is directed in the travel direction and has a low aerodynamic resistance. The signaling system furthermore has a signaling unit that is disposed within the housing and is configured for providing emergency services signals. The housing has at least two housing sides, wherein one housing side faces the roof, and the other housing side faces away from the roof. The side that faces the roof is adapted to the shape of the roof. The housing side that faces away from the roof corresponds to the suction side of an airfoil profile.

17 Claims, 6 Drawing Sheets

(56) References Cited

U.S. PATENT DOCUMENTS

| | | | | |
|---|---|---|---|---|
| 4,635,039 A * | 1/1987 | Gosswiller | ............... | B60Q 5/00 340/404.1 |
| 4,707,014 A * | 11/1987 | Rich | ............... | B60Q 1/05 296/180.1 |
| 5,412,548 A * | 5/1995 | Yee | ............... | F21L 4/005 362/186 |
| 5,560,701 A * | 10/1996 | Payne | ............... | B60Q 1/2611 362/493 |
| 5,813,640 A * | 9/1998 | Koch | ............... | G09F 7/18 248/222.11 |
| 5,847,826 A * | 12/1998 | Fukui | ............... | B60S 1/0833 356/335 |
| 5,884,824 A * | 3/1999 | Spring, Jr. | ............... | B60R 9/042 224/310 |
| 5,961,080 A * | 10/1999 | Sinha | ............... | B64C 23/04 244/204 |
| 5,988,839 A * | 11/1999 | Pokorney | ............... | B60Q 1/30 362/493 |
| 7,825,790 B2 | 11/2010 | Tallinger | | |
| 9,714,083 B2 * | 7/2017 | Rawlings | ............... | B64C 21/10 |
| 2002/0105432 A1 * | 8/2002 | Pederson | ............... | B64D 47/06 340/815.45 |
| 2005/0227078 A1 * | 10/2005 | Power | ............... | F01D 5/288 428/408 |
| 2006/0002122 A1 * | 1/2006 | Griffin | ............... | B60Q 1/52 362/493 |
| 2006/0043770 A1 * | 3/2006 | Preiss | ............... | B62D 35/007 296/180.1 |
| 2006/0086470 A1 * | 4/2006 | Ghazali | ............... | B60J 11/00 160/370.21 |
| 2006/0226283 A1 * | 10/2006 | Shepshelovich | ............... | B64C 3/14 244/35 R |
| 2006/0273121 A1 * | 12/2006 | Thomas | ............... | B60R 9/058 224/322 |
| 2011/0175719 A1 * | 7/2011 | Ford | ............... | B60Q 5/00 340/473 |
| 2012/0003090 A1 * | 1/2012 | Smith | ............... | F03D 7/06 416/91 |
| 2013/0154821 A1 * | 6/2013 | Miller | ............... | G08C 17/02 340/471 |
| 2014/0327263 A1 * | 11/2014 | Van Arnam | ............... | A61G 3/00 296/19 |
| 2017/0023058 A1 * | 1/2017 | Otschik | ............... | F16C 17/028 |
| 2017/0369106 A1 * | 12/2017 | Williams | ............... | G01S 7/4813 |
| 2018/0118097 A1 * | 5/2018 | Thompson | ............... | F21S 45/10 |

FOREIGN PATENT DOCUMENTS

| | | |
|---|---|---|
| DE | 20310472 U1 | 11/2004 |
| DE | 102007048226 A1 | 4/2008 |
| WO | 2014195732 A2 | 12/2014 |

* cited by examiner

SIGNALING SYSTEM FOR FASTENING TO A ROOF OF A MOTOR VEHICLE AND MOTOR VEHICLE

TECHNICAL FIELD

The present disclosure relates to a signaling system for providing at least one emergency services signal and for fastening to a roof of a motor vehicle. The present disclosure furthermore relates to a motor vehicle.

BACKGROUND

Signaling systems of response vehicles that are configured for providing emergency services signals are typically fastened to the roof of the response vehicle. Fastening the signaling system to the roof of the motor vehicle primarily has the advantage that the signaling system is readily visible to other traffic. The other traffic can thus be alerted in a timely manner to the special priorities of a response vehicle.

However, arranging the signaling system on the roof of a response vehicle carries the disadvantage of the air drag of the entire vehicle being increased. In particular with a view to electrically operated response vehicles for the police force, manufacturers of motor vehicles strive to reduce air drag as far as possible. The range of the electrically driven response vehicle is the primary focus herein. A further objective of the manufacturer lies in increasing the maximum speed of the response vehicle. In order for the pursuit of fast motor vehicles to be possible at all times, the reduction in terms of air drag is also appropriate in this respect. Moreover, a significant increase in fuel consumption can be furthermore observed in the case of a response vehicle with high mileage that is equipped with a signaling system. Furthermore, the driving characteristics are disadvantageously influenced by virtue of the turbulences that are created on account of the signaling system.

The reduction in air drag has already been a topic in numerous documents. Since the lamp units of the signaling systems have assumed increasingly small construction modes only in recent years, the construction of a signaling system of a response vehicle is typically still voluminous. U.S. Pat. No. 4,334,211 A attempts to avoid air turbulences on such voluminous signaling systems in that turbulences are generated on that side of the signaling system that faces the travel direction. The superimposition of the turbulences thus generated on the turbulences of the air stream reduces the air drag of the entire vehicle. WO 2014/195732 A2 takes another approach. The air drag is reduced by reducing the cross-sectional area in the travel direction. However, it is a common feature of both disclosures that said features are fitted to the roof in such a manner that the air can flow between the signaling system and the vehicle roof.

A signaling system having a housing, the housing side of the latter facing the roof being fastened directly to the roof such that no air can flow between the signaling system and the roof, is disclosed in DE 203 10 472 U1. The shape of the housing of the signaling system of DE 203 10 472 U1 is furthermore designed in order to further minimize air drag.

U.S. Pat. No. 7,825,790 B2 takes an entirely different approach. The signaling system in this disclosure is integrated in the roof of the response vehicle. The signaling system of the response vehicle is designed in such a manner that the signaling system, when said signaling system is to be used, is deployed from the roof and is retracted into the roof after use. In one design embodiment of the signaling system described in U.S. Pat. No. 7,825,790 B2, the air drag in the deployed state can be reduced by setting the angle of the flat housing relative to the vehicle roof in a variable manner. The air drag is at its lowest when the signaling system in the unused state is hidden in the roof.

SUMMARY

It is an object of the present disclosure to provide an advantageous signaling system for providing at least one emergency services signal and for fastening to a roof of a motor vehicle. It is a further object of the present disclosure to provide a motor vehicle that is required for utilizing the signaling system.

The first object is achieved by a signaling system as set forth in the following claims.

According to the disclosure, a signaling system for providing at least one emergency services signal and for fastening to a roof of a motor vehicle is provided. The signaling system comprises a housing, having a low aerodynamic resistance. The signaling system furthermore comprises a signaling unit that is disposed within the housing and is configured for providing emergency services signals. The housing has at least two housing sides, wherein one housing side faces the roof, and the other housing side faces away from the roof. That side that faces the roof is adapted to the shape of the roof. That housing side that faces away from the roof corresponds to the suction side of an airfoil profile. The motor vehicle can be a response vehicle of the police force, the fire brigade, or of a private security service.

According to one design embodiment, that housing side of the signaling system that faces away from the roof corresponds to the suction side of a NACA profile. NACA profiles are two-dimensional cross sections of airfoil profiles for airplanes. NACA herein is the "National Advisory Committee for Aeronautics". The NACA profiles represent various initial profiles for designs of further airfoils. The NACA profiles per se herein are variations of an original profile. The development of airfoils, in particular in the beginnings of aeronautical history, was mostly based on NACA profiles. The signaling system of the present disclosure preferably has a housing, the housing side of the latter that faces away from the roof corresponding to the suction side of a NACA profile 8416.

An air stream is created during the travel of the motor vehicle. The construction of a modern motor vehicle is designed in such a manner that the air stream is directed past the roof of the motor vehicle mostly in a laminar manner. Low-pressure regions are created, in particular behind edges, at which the direction of the air stream is modified. According to one design embodiment, the signaling system is disposed in one of these low-pressure regions. According to a further design embodiment, the edge of the signaling system that faces the travel direction has a spacing of 0.45 m to 0.60 m from that edge of the windshield that faces away from the travel direction.

According to one design embodiment, the air drag is further reduced in that the housing side that faces away from the roof of the motor vehicle has a rough layer that is configured for reducing lift. The lift that is created on account of the shape of the housing of the signaling system is further reduced by the formation of comparatively minor turbulences. The rough layer is transparent. The light of the signaling unit within the housing is thus not absorbed by the rough layer. According to a further design embodiment of the signaling system, the rough layer can have a Reynolds number of more than 300,000.

The signaling system is connected directly to the roof such that no air can flow between the signaling system and the roof. According to one design embodiment of the signaling system, an elastic layer is disposed between the signaling system and the roof. This elastic layer compensates for the different roof shapes of the individual roof types so as to ensure an adaptation of that housing side of the signaling system that faces the roof to the roof shape.

In order for a paintwork of the roof not to be damaged, according to one design embodiment of the signaling system a non-woven material layer is disposed between that housing side that faces the roof and the roof.

According to one design embodiment of the signaling system, the spacing between the housing and the windshield is furthermore dependent on the vehicle type, on the one hand. On the other hand, this spacing is dependent on an angle which is defined between the windshield and a mean roof profile. A mean roof profile is defined by an average determination of the actual roof profile along the direction of the air stream.

According to one design embodiment of the signaling system, the signaling unit in the housing of the signaling system has an emergency-vehicle light unit and a tone-sequence horn.

The housing of the signaling system may have end sides on which in each case one fastening device is disposed. These fastening devices are configured for fastening the signaling system to a roof of a motor vehicle.

Moreover, a motor vehicle is provided having a signaling system as described herein.

BRIEF DESCRIPTION OF THE DRAWING FIGURES

Further features, properties, and advantages of the signaling system will be derived from the exemplary embodiment hereunder with reference to the appended figures, in which.

An exemplary embodiment of the signaling system for providing at least one emergency services signal and for fastening to a roof of a motor vehicle will be described hereunder with reference to the figures.

DETAILED DESCRIPTION

Figure 1:
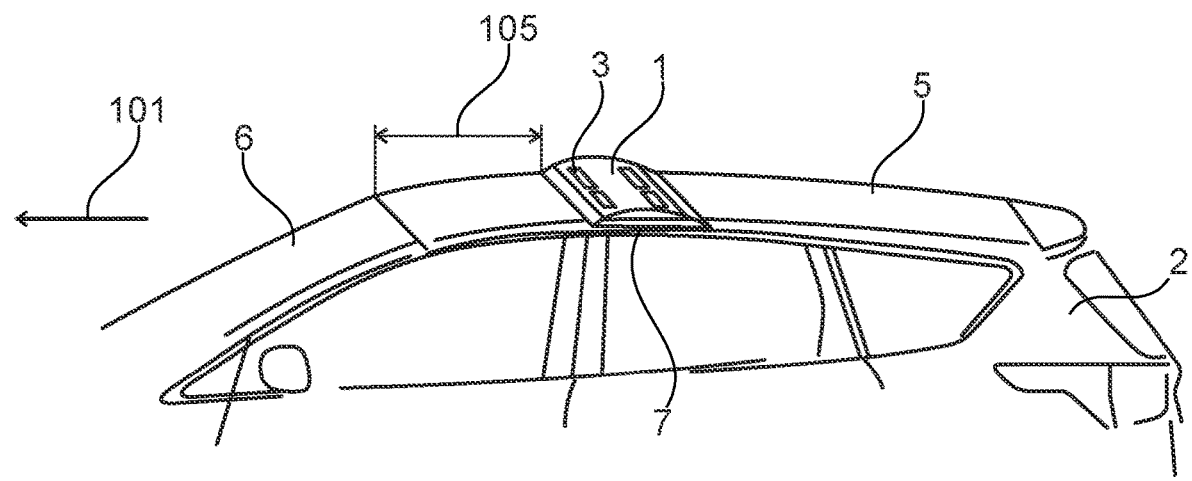
FIG. 1 shows a response vehicle having the new and improved signaling system which is fitted to a roof of a response vehicle.

The signaling system 1 in the present exemplary embodiment is fitted to a police vehicle 2, as is illustrated in FIG. 1. Specifically in the case of police vehicles 2 it is enormously important that the motor vehicles can attain a speed that corresponds to that of the pursued target, on the one hand, and on the other hand have a driving characteristic such that a pursuit can also be carried out to the end. Both vehicle properties are influenced by the air drag. Apart from the vehicle properties mentioned, the air drag also influences the fuel consumption of the motor vehicles 2 and thus the economy of the motor vehicles. In addition, the demand for electric response vehicles 2 is increasing. Since the ranges of the electric response vehicles 2 in comparison to the ranges of motor vehicles 2 with petrol engines or diesel engines, respectively, are still very limited, great efforts are being undertaken in order for the air drag of the response vehicles 2 to be minimized as far as possible.

Figure 3:
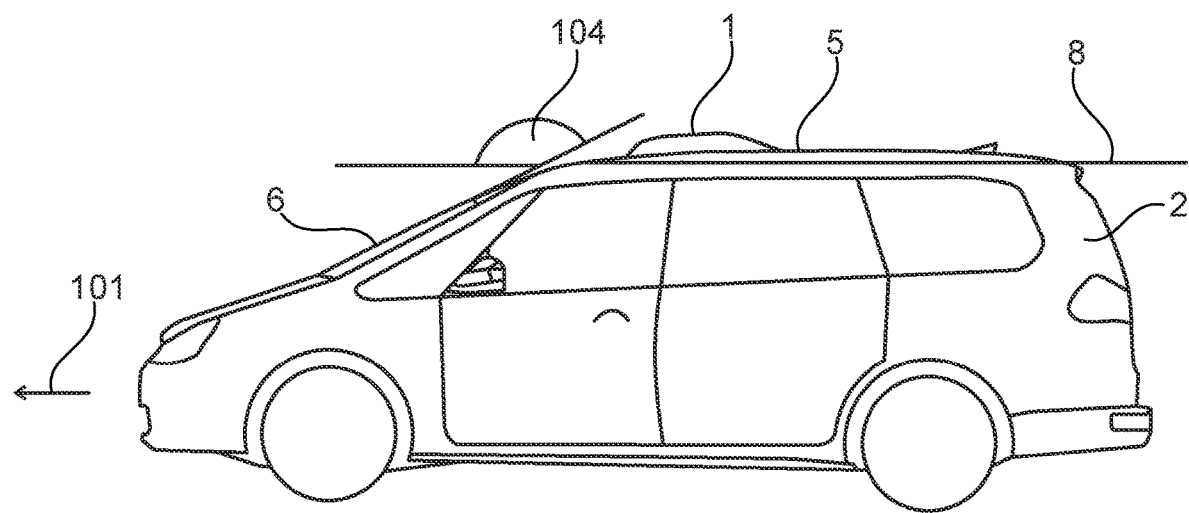
FIG. 3 shows a lateral illustration of a response vehicle having the signaling system.
Figure 4:
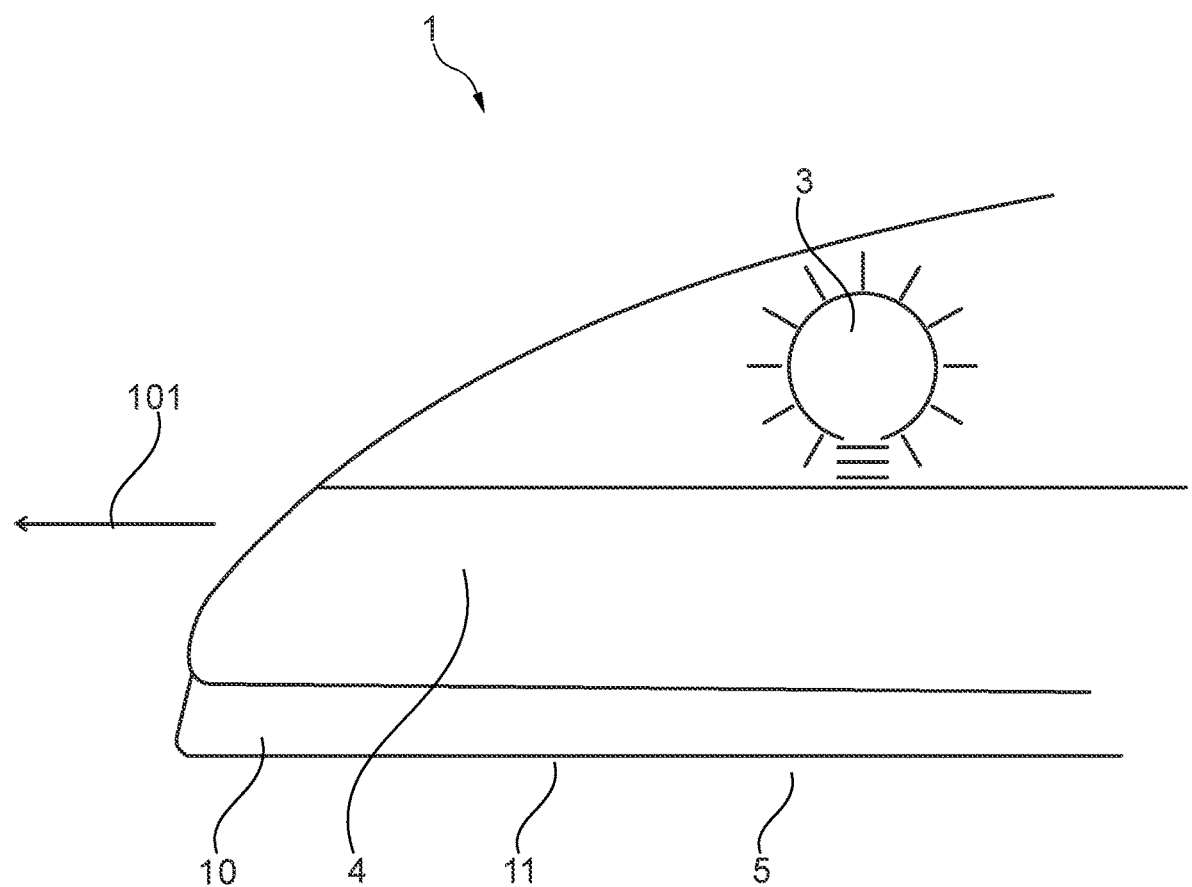
FIG. 4 shows a housing of the signaling system, wherein only that region of the housing of the signaling system that faces the travel direction is illustrated.
Figure 5:
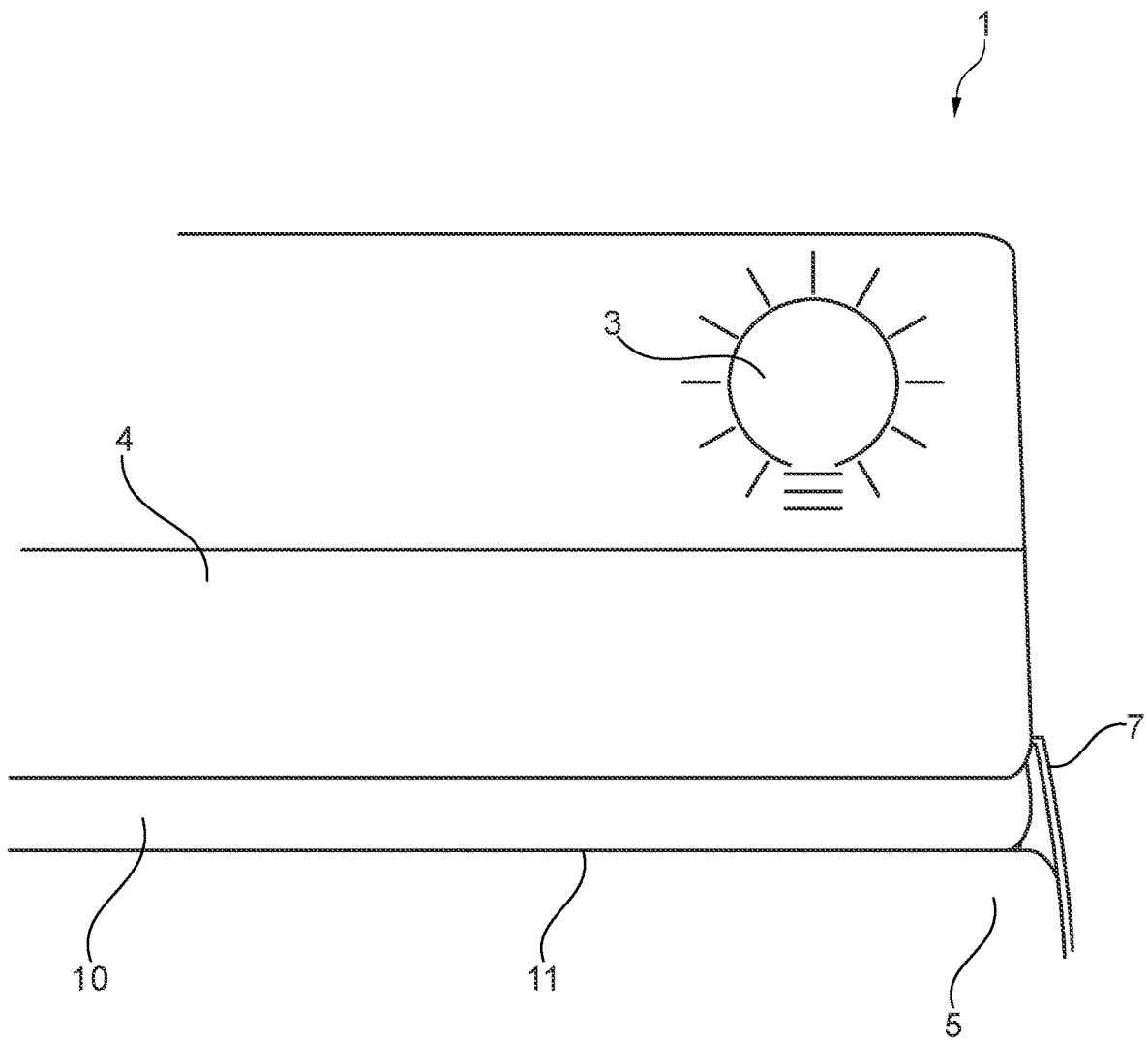
FIG. 5 shows the signaling system in an illustration from the front, wherein only the driver's side is illustrated.

The police response vehicle 2 in the illustrated exemplary embodiment has a signaling unit 3 in which an emergency-vehicle light unit and a tone-sequence horn are integrated. The signaling unit 3 is configured for providing emergency services signals. This signaling unit 3 is fitted in a housing 4 of a signaling system 1 on the roof 5 of the police response vehicle 2. The housing 4 of the signaling system 1 at the end sides is connected to the roof 5 of the response vehicle 2 by way of a fastening device 7, as can be readily seen in FIG. 5. The housing 4 of the signaling system 1 has a low aerodynamic resistance in the travel direction 101. See FIG. 3. That housing side 4a of the signaling system 1 that faces the roof 5 is connected to the roof 5 of the response vehicle 2 in such a manner that no air can flow between the roof 5 and the signaling system 1. In order for the signaling system 1 to be able to be fitted to different types of response vehicles 2, an elastic layer 10 is located between the housing 4 of the signaling system 1 and the roof 5 of the response vehicle 2 in the present exemplary embodiment (cf. FIG. 4). Furthermore, a non-woven material layer 11 between the housing 4 of the signaling system 1 and the roof 5 of the response vehicle 2 prevents scratching of the paint of the response vehicle 2.

Figure 6:
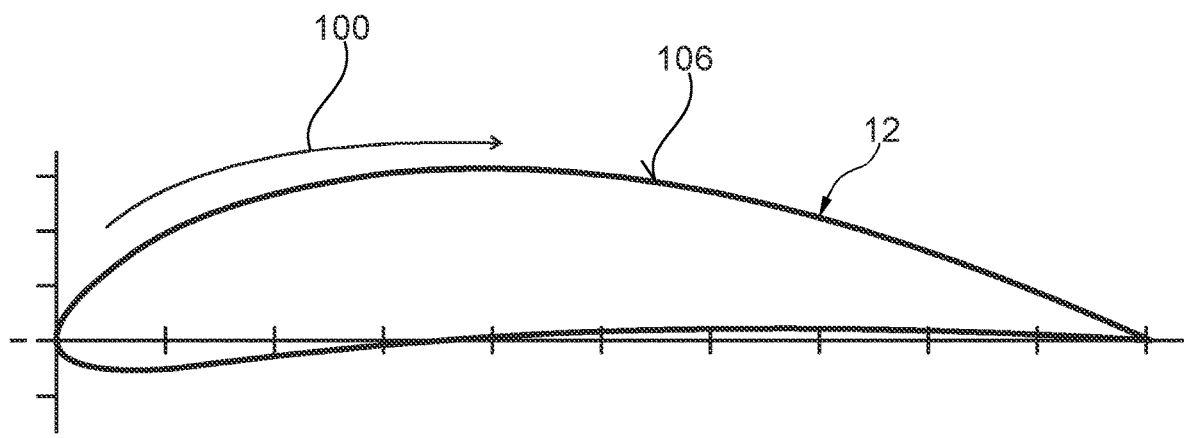
FIG. 6 shows a cross section of an airfoil profile which corresponds to the NACA profile 8416.

The housing side 4b of the signaling system 1 that faces away from the roof 5 corresponds to the suction side 106 of an airfoil profile 12. The design embodiments of the housing side 4b that faces away from the roof 5 can be based on the most varied of airfoil profiles 12. NACA profiles are preferably used. Above all, the NACA 8416 airfoil profile 12 has a suction side 106, the transverse profile of the latter being very suitable as a blueprint for the transverse profile of a housing side 4b of a signaling system 1 that faces away from the roof 5. The NACA 8416 profile is shown in FIG. 6.

Figure 2:
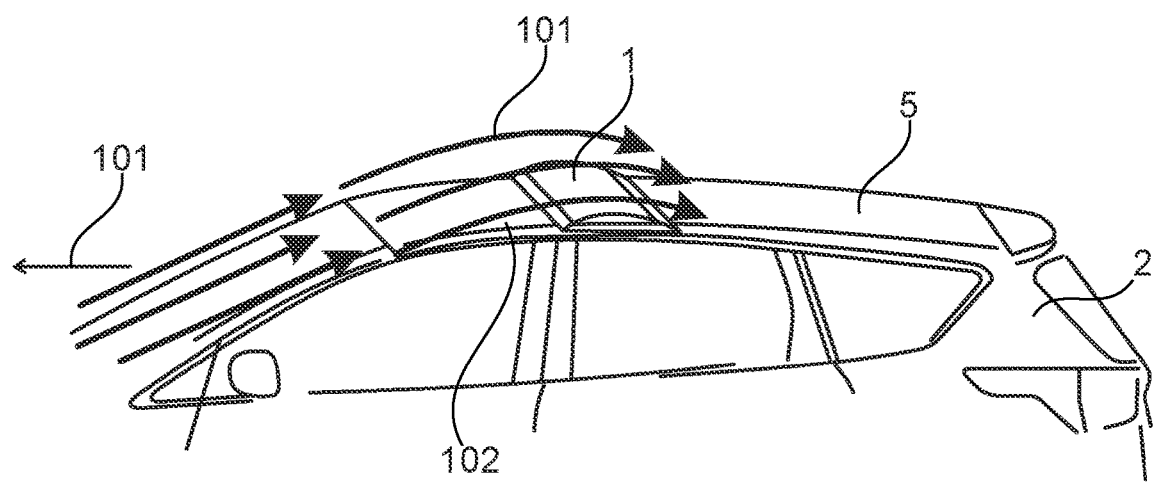
FIG. 2 shows the response vehicle having the signaling system, wherein the air stream over the roof of the motor vehicle is included in the illustration in FIG. 2.

The signaling system 1 is fitted to the roof 5 of the response vehicle 2 in such a manner that the air that flows across the roof 5 is not influenced, so that no further additional air turbulences are created. This is achieved in that the signaling system 1 is disposed in a low-pressure region 102 of the air stream 100. See FIG. 2. A low-pressure region 102 of the air stream 100 is created, for example, behind edges which are rounded in such a manner that the laminar air stream 100 does not break away and that no air turbulences arise. In the case of modern motor vehicles 2, such low-pressure regions 102 are created just behind the windshield 6, downstream of the air stream 100 (cf. FIG. 2). The signaling system 1 in the exemplary embodiment is fitted in this region. In most instances, a spacing 105 (see FIG. 1) of 0.45 m to 0.60 m is maintained between the housing 4 and the windshield 6. However, said spacing 105 is dependent on the vehicle type. Furthermore, this correlation is influenced by the angle 104 between the mean roof profile and the ascent of the windshield 6 (cf. FIG. 3). The exact location of the low-pressure region 102 can vary here, depending on how the air flows in a laminar manner across the roof 5 of the motor vehicle 2. Furthermore, the location of the low-pressure region 102 depends on the speed of the motor vehicle 2.

Figure 7:
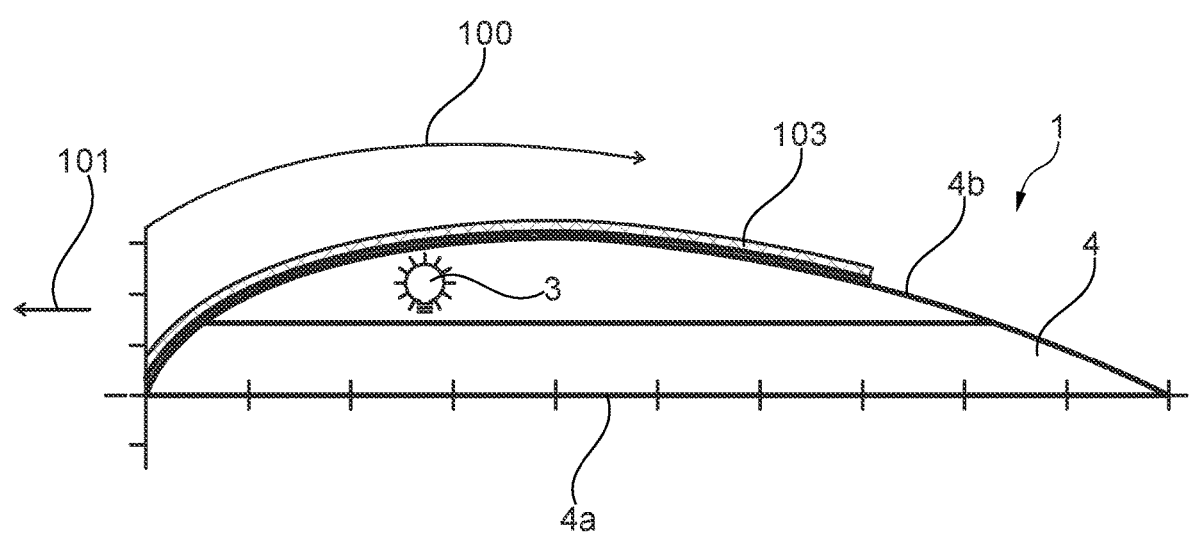
FIG. 7 shows a cross section of a housing of one possible embodiment of the signaling system.

That housing side 4 of the signaling system 1 that faces away from the roof 5 in the exemplary embodiment is covered with a rough layer or surface 103 (cf. FIG. 7). This rough layer 103 has the function of generating minor air turbulences. It is thus achieved that the motor vehicle 2 is not imparted any additional lift. In particular, lift is to be prevented by the reproduction of an airfoil profile 12 such as by the reproduction of a NACA profile, in particular of a NACA profile 8416, which has been optimized in terms of a high suction side 106. Said rough layer 103 is furthermore transparent such that the light that is created within the housing 4 of the signaling system 1 can pass through the rough layer 103 without being absorbed. Furthermore, the rough layer 103 has a Reynolds number of more than 300,000.

The present signaling system 1 has been described in detail for the purpose of explanation by means of an exemplary embodiment. A person skilled in the art will however realize that deviations from the exemplary embodiment are possible, and that the exemplary embodiment may be deviated from. Apart from the response vehicles of the police, motor vehicles of the fire brigade or of a private security service can thus be utilized. The signaling system 1 is therefore not intended to be limited to the exemplary embodiment, but rather only by the appended claims.

What is claimed:

1. A signaling system for providing at least one emergency services signal and for fastening to a roof of a motor vehicle, comprising:
    a housing and a signaling unit that is disposed within the housing and is configured for providing said at least one emergency services signal, wherein the housing has a first housing side that faces the motor vehicle and is adapted to the roof, and a second housing side that faces away from the roof, wherein said second housing side having a static shape that corresponds to a suction side of a forward airfoil profile.

2. The signaling system as claimed in claim 1, wherein an air stream that during travel of the motor vehicle is created above the roof of the motor vehicle generates a low-pressure region, wherein the signaling system is disposed on the roof within the low-pressure region.

3. The signaling system as claimed in claim 2, wherein said second housing side corresponds to the suction side of a NACA profile.

4. The signaling system as claimed in claim 3, wherein said second housing side has a transparent rough layer that is configured for reducing lift.

5. The signaling system as claimed in claim 4, wherein said transparent rough layer has a Reynolds number of greater than 300,000.

6. The signaling system as claimed in claim 5, wherein said first housing side has an elastic layer that is configured for matching a shape of the roof.

7. The signaling system as claimed in claim 6, wherein said first housing side has a non-woven material layer that is configured for protecting paintwork of the roof.

8. The signaling system as claimed in claim 7, wherein a spacing of 0.45 m to 0.60 m is maintained between the housing and a windshield of said motor vehicle.

9. The signaling system as claimed in claim 8, wherein the spacing between the housing and the windshield is dependent on a vehicle type and on an angle between the windshield and a mean roof profile.

10. The signaling system as claimed in claim 9, wherein the signaling unit has an emergency-vehicle light unit and a tone-sequence horn.

11. The signaling system of claim 10, wherein the housing has end sides with a fastening device that is configured for fastening the signaling system to the roof of the motor vehicle.

12. A motor vehicle having the signaling system as claimed in claim 1.

13. A motor vehicle having the signaling system as claimed in claim 3.

14. A motor vehicle having the signaling system as claimed in claim 5.

15. A motor vehicle having the signaling system as claimed in claim 7.

16. A motor vehicle having the signaling system as claimed in claim 9.

17. A motor vehicle having the signaling system as claimed in claim 11.

* * * * *